Dec. 23, 1924.
E. L. GUSTAFSON
1,520,413
VALVE FOR CORLISS ENGINES
Filed Aug. 21, 1924
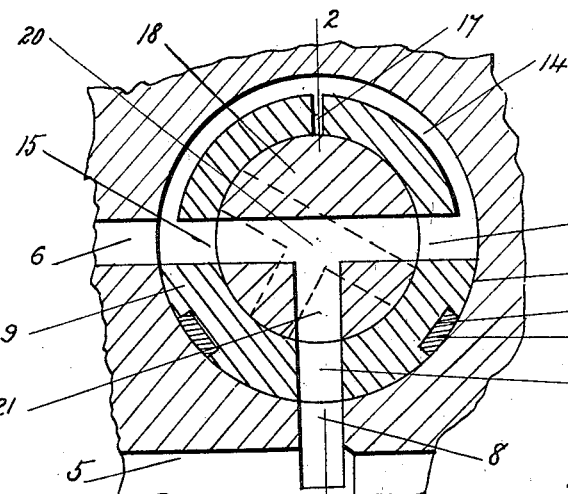
FIG_1_
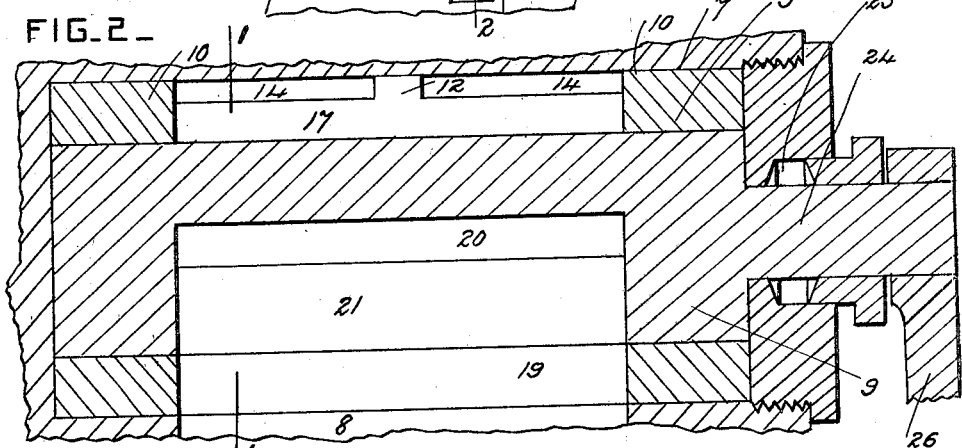
FIG_2_
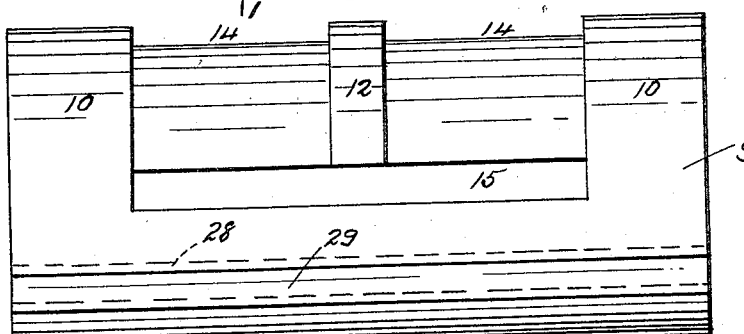
FIG_3_
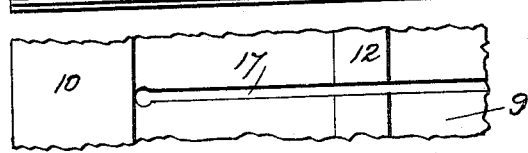
FIG_4_
Inventor.
Edward L. Gustafson
by Herbert W. Jenner,
Attorney Patented Dec. 23, 1924.

1,520,413

UNITED STATES PATENT OFFICE.

EDWARD L. GUSTAFSON, OF HOLDREGE, NEBRASKA.

VALVE FOR CORLISS ENGINES.

Application filed August 21, 1924. Serial No. 733,346.

*To all whom it may concern:*

Be it known that I, EDWARD L. GUSTAFSON, a citizen of the United States, residing at Holdrege, in the county of Phelps and State of Nebraska, have invented certain new and useful Improvements in Valves for Corliss Engines, of which the following is a specification.

This invention relates to the steam inlet valves used on Corliss engines; and it consists in the novel construction and combination of the parts hereinafter fully described and claimed whereby the valve is balanced in a preferred manner, and works with very little friction, and is inexpensive to make.

In the drawings, Figure 1 is a cross-section through a steam valve, and portions of the steam cylinder, taken on the line 1—1 in Fig. 2 and constructed according to this invention. Fig. 2 is a longitudinal section through the valve taken on the line 2—2 in Fig. 1. Fig. 3 is a side view of the bush removed from the cylinder. Fig. 4 is a plan view of one end portion of the bush showing the slit.

The engine steam cylinder 5 is provided with a steam inlet passage 6 or steam chest which is common to both ends of the cylinder. Each end portion of the steam cylinder has also a cylinder 7 for the valve and its bush, and a steam inlet port 8 which leads into the steam cylinder. Each end of the steam cylinder has also a similar steam inlet valve, and this valve is not used as an exhaust valve. The valve cylinder 7 is bored truly cylindrical for the whole of its length, and a bush 9 is secured tightly in it. The end portions 10 and a narrow bearing strip 12 at the middle part of the bush are turned truly cylindrical with the rest of the bush, and a recess 14 is formed in the upper half of the bush between the end portions 10 and the strip 12. This recess is divided into two parts by the strip 12.

Slots 15 and 16 are formed at diametrically opposite points in the sides of the bush at the lower ends of the recess 14, and these slots extend longitudinally between the end portions 10. A narrow slit 17 is also formed in the top of the bush, and it also extends between the end portions 10. The area of this slit is proportioned so as to balance the valve in the preferred manner. The steam valve 18 is a plain cylindrical plug valve which is mounted to rock in the bush 9. The bush 9 has also an inlet port 19 in its lower side vertically under the slit 17, and the port 19 is arranged to register with the steam inlet port 8. One slot 15 in the side of the bush is arranged to register with the steam inlet passage 6.

The steam inlet valve 18 has a cross-passage 20 extending diametrically through it, and communicating at one end with the slot 15, and at the other end with the slot 16, when the valve is open to admit steam. The steam inlet valve has also a passage 21 which connects the middle part of the cross-passage 20 with the inlet port 19 when the valve is open. The passages 20 and 21 are of the same length as the slots 15 and 16 and the port 19.

The steam valve has a stem 24 at one end which projects through a stuffing-box 25 on the cylinder, and it is provided with a crank 26 or other approved means for operating it. When the valve is in the position shown in full lines in Fig. 1 the steam passes from the inlet passage 6 through the recess 14 to each end of the cross-passage 20, and thence into the cylinder, and the steam in the recess and in the narrow slit 17 holds the valve at a preferred balance in the bush, so that it moves very freely and is steam tight.

Two grooves 28 are formed longitudinally in the outer surface of the bush between the ports 15 and 19 and between the ports 16 and 19, respectively, and packing 29, such as lead, is packed into these grooves so as to enable the valve to work as steam-tight as possible by preventing leak around the bush.

When the valve is rocked so that its passages assume the position shown in dotted lines in Fig. 1, the steam is cut off, but the preferred balance of the valve is not destroyed, as the two slots 15 and 16 and the slit 17 are still open to the steam inlet passage 6. The cylinder 7 can be bored more truly cylindrical and at less expense when the recess 14 is formed in the bush and not in the cylinder. The strip 12 enables the bush to maintain its truly cylindrical form when exposed to heat and steam pressure.

What I claim is:

1. The combination, with an engine cylinder having a valve cylinder provided with a steam inlet passage and a steam inlet port leading into the engine cylinder, of a bush secured in the valve cylinder and having an inlet port which registers with the said steam inlet port, said bush having also slots in its sides at diametrically opposite points, a slit arranged diametrically opposite to the said inlet port, and a recess in one side of its periphery which connects the two slots and the slit, one of the said slots being arranged to register with the said steam passage, and a cylindrical steam inlet valve mounted to rock in the said bush and having a cross-passage extending through it and adapted to register simultaneously with the slots in the sides of the bush, said valve having also a passage which connects the cross-passage with the inlet port of the bush when its cross passage is in communication with the side slots of the bush.

2. A steam cylinder and inlet valve as set forth in claim 1, the said bush being provided with a strip at its middle part which bears on the valve cylinder and divides the said recess into two parts.

In testimony whereof I have affixed my signature.

EDWARD L. GUSTAFSON.